United States Patent
Koll et al.

(10) Patent No.: US 7,239,582 B2
(45) Date of Patent: Jul. 3, 2007

(54) INTERPOLATION OF OPTICAL DISC VERTICAL DISPLACEMENT INFORMATION

(75) Inventors: Andrew Koll, Albany, OR (US); Andrew L. Van Brocklin, Corvallis, OR (US); Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 10/342,017

(22) Filed: Jan. 13, 2003

(65) Prior Publication Data

US 2004/0136279 A1    Jul. 15, 2004

(51) Int. Cl.
   *G11B 7/095* (2006.01)
(52) U.S. Cl. .............. 369/44.32; 369/53.14; 369/53.23; 369/53.28
(58) Field of Classification Search ........ 347/246–247, 347/236
   See application file for complete search history.

(56) References Cited

U.S. PATENT DOCUMENTS 4,710,908 A    12/1987  Ohshima et al.
4,891,798 A     1/1990  Shinkai
5,093,798 A  *  3/1992  Kita ........................... 345/641
6,567,357 B2 *  5/2003  Kishimoto et al. ...... 369/53.14
6,842,414 B1 *  1/2005  Park ......................... 369/44.32
6,985,419 B2 *  1/2006  Ikeda et al. .............. 369/53.23
2003/0108708 A1* 6/2003 Anderson et al. ........ 369/275.1

FOREIGN PATENT DOCUMENTS

JP          11248440 A  *  9/1999
JP         2002203321      7/2002

OTHER PUBLICATIONS

Machine translation and English abstract corresponding to JP 11248440 A.*
HP Patent Application No. 10011728-1; PTO U.S. Appl. No. 09/976,877, filed Oct. 11, 2001; "Integrated CD/DVD Recording And Labeling"; 87 pages.

* cited by examiner

*Primary Examiner*—Wayne Young
*Assistant Examiner*—Nathan Danielsen

(57) ABSTRACT

A method of one embodiment of the invention is disclosed that determines optical disc vertical displacement information at a number of positions on an optical disc. The method interpolates optical disc vertical displacement information at a number of other positions on the optical disc from the vertical displacement information determined.

26 Claims, 8 Drawing Sheets

INTERPOLATION OF OPTICAL DISC VERTICAL DISPLACEMENT INFORMATION

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. For DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the expensive labels must be carefully aligned on the discs, and so on. Special-purpose printers that print directly on the discs can be used, but such printers are fairly expensive.

In the patent application entitled "Integrated CD/DVD Recording and Label", filed on Oct. 11, 2001, and assigned Ser. No. 09/976,877, a solution to these difficulties is described, in which a laser is used to label optical discs. The focusing mechanism of an optical disc device including the laser usually has a feedback mechanism by which the laser's beam is focused through an objective lens, utilizing the reflectivity of the surface incident to the beam. Where the label surfaces of such optical discs have relatively low reflectivity, it would be advantageous to improve focusing of the laser beam on such surfaces, especially in situations in which the optical discs are slightly warped, which can be relatively commonplace.

SUMMARY OF INVENTION

The drawings referenced herein form a part of the specification. Features shown in the drawings are meant as illustrative of only some embodiments of the invention, and not of all embodiments of the invention, unless otherwise explicitly indicated, and implications to the contrary are otherwise not to be made.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, optical, opto-mechanical, and other changes may be made without departing from the spirit or scope of the present invention. The following detailed description is, therefore, not to be taken in a limiting sense, and the scope of the present invention is defined only by the appended claims.

Overview and Method

Figure 1:
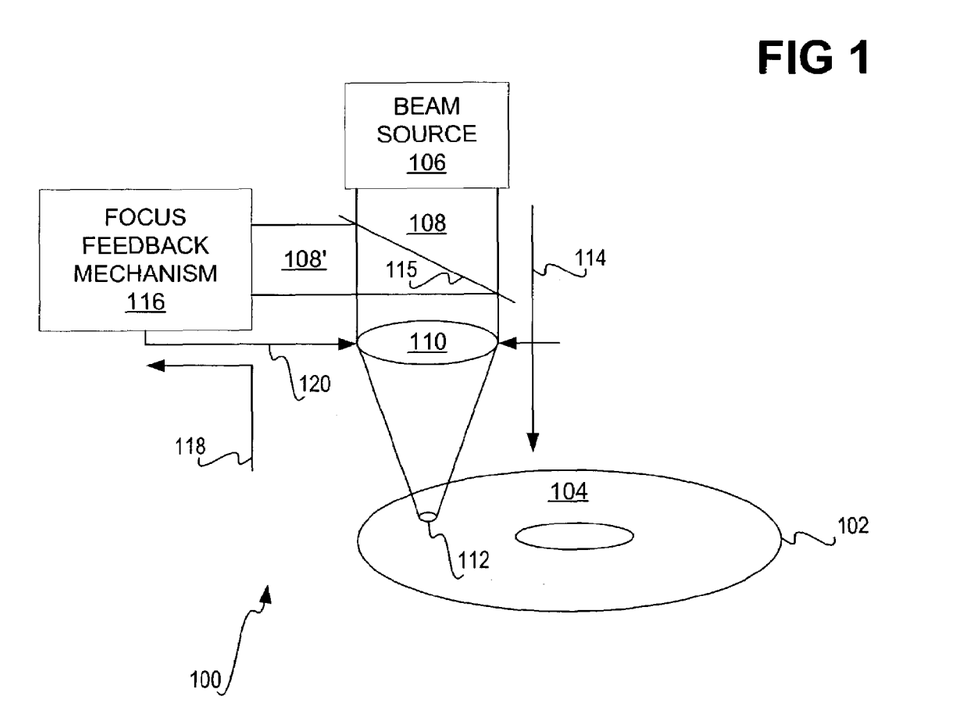
FIG. 1 is a diagram of a representative mass storage device in which a feedback mechanism is utilized to focus an optical beam at a spot on an optical disc, in conjunction with which embodiments of the invention may be implemented.

FIG. 1 illustratively shows a mass storage device 100 in which an optical beam 108 is focused through an objective lens 110 onto a spot 112 of a surface 104 of an optical disc 102, in conjunction with which embodiments of the invention may be implemented. As can be appreciated by those of ordinary skill within the art, other mass storage device components in addition to and/or in lieu of those depicted in FIG. 1 may normally be present, but are omitted only for sake of illustrative and descriptive clarity. The optical disc 102 may be a type of compact disc (CD), a type of digital versatile disc (DVD), or another type of optical disc. A beam source 106 emits the optical beam 108, such as a laser beam or an electron beam (e-beam). The optical beam 108 is focused through the objective lens 110 onto the desired spot 112 of the surface 104 of the optical disc 102. The arrow 114 indicates the path of the optical beam 108 from the beam source 106 through the objective lens 110 and onto the spot 112.

The spot 112 on the surface 104 may reflect the optical beam 108 back upwards, through the objective lens 110, where an optical mechanism 115 diverts the reflected optical beam 108, as the beam 108', to a focus feedback mechanism 116. The arrow 118 indicates the path of the optical beam 108 as reflected from the spot 112, through the lens 110, to the optical mechanism 115, and to the focus feedback mechanism 116. The optical mechanism 115 may include one or more mirrors, lenses, and/or other optical processing mechanisms. Thus it can be stated that the mechanism 116 senses the reflectivity of the spot 112.

Based on the sensing of the reflected beam 108' by the focus feedback mechanism 116, the mechanism 116 controls the position of the objective lens 110, as indicated by the arrow 120, so that the optical beam 108 is properly focused on the spot 112. For instance, the mechanism 116 may control the drive current that governs the position of the objective lens 110. The mechanism 116 may thus also be said to be directly or indirectly measuring the drive current of the objective lens 110 as it properly focuses the optical beam 108 on the spot 112. The mechanism 116 may include hardware and/or software components, as described in more detail in a later section of the detailed description.

The focus feedback mechanism 116 therefore relies on the surface 104 of the optical disc 102, such as the spot 112 thereof, reflecting the optical beam. 108 as the reflected optical beam 108' into the mechanism 116. Some optical disc surfaces, such as optically writable and/or readable data regions on which data can be optically written and/or read, usually have sufficiently high reflectivity for the focus feedback mechanism 116 to operate. However, other optical disc surfaces, such as the optically writable and/or readable label regions disclosed in the commonly assigned patent application entitled "Integrated CD/DVD Recording and Label", filed on Oct. 11, 2001, and assigned Ser. No. 09/976,877, that allow for markings to be optically written and/or read, may have insufficiently high reflectivity, or relatively low reflectivity. This means that the focus feedback mechanism 116 may not properly control the beam source 106 when the optical beam 108 is incident to the surface 104 being such a label or other relatively low-reflectivity surface, making it difficult or impossible to properly focus the beam 108.

Figure 2A:
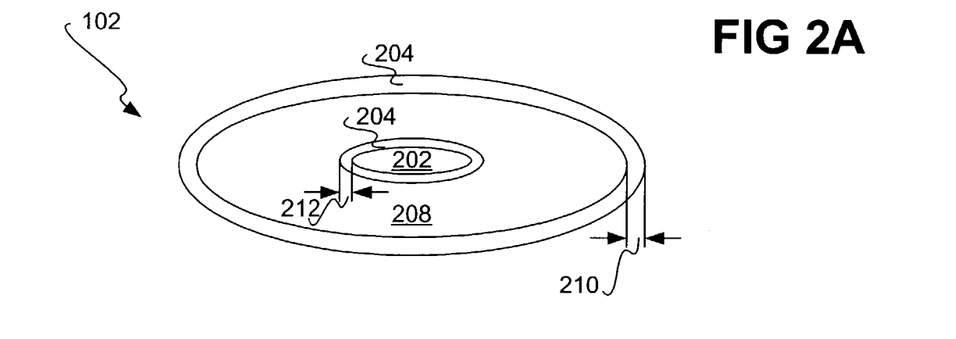
FIGS. 2A and 2B are a perspective-view diagram and a cross-sectional side-profile diagram, respectively, of an optical disc having a low-reflectivity optically writable label surface, in conjunction with which embodiments of the invention may be implemented.
Figure 2B:
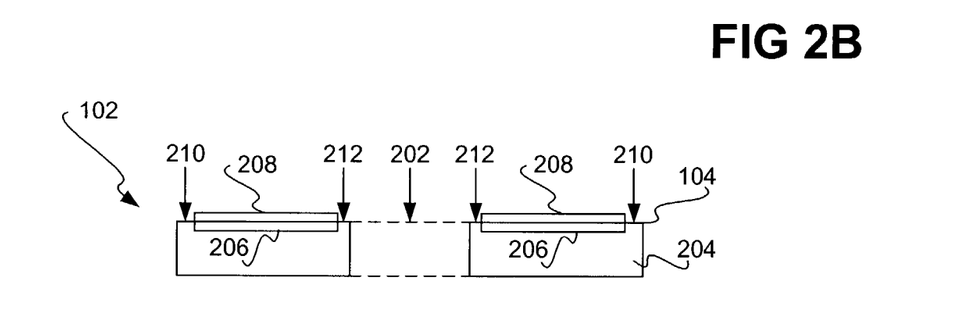

FIGS. 2A and 2B show a perspective view and a cross-sectional side profile, respectively, of such a representative optical disc 102, in conjunction with which embodiments of the invention may be implemented. The optical disc 102 includes an at least substantially transparent substrate 204, such as polycarbonate. The substrate 204 can have high reflectivity. An optically writable and/or readable data surface 206 is then usually fabricated within the substrate 204, within the surface 104 of the optical disc 102. The data surface 206 also may have high reflectivity. The data surface 206 is considered to be part of the surface 104 of the optical disc 102, even though in actuality the data surface 206 is on the inside of the surface 104 of the optical disc 102. This is because when the optical beam 108 of FIG. 1 is incident to the surface 104, it is reflected off the data surface 206, since the substrate 204 is at least substantially transparent.

Furthermore, an optically writable and/or readable label surface 208 is coated onto the data surface 206. That is, the label surface 208 is coated onto the surface 104 of the substrate 204 where the data surface 206 is present. The label surface 208 is thus opposite, or oppositely situated, to the data surface 206. The label surface 208 may have relatively low reflectivity. The thicknesses of the data surface 206 and the label surface 208 are exaggerated in FIG. 2B for illustrative clarity, and are generally considerably thinner than depicted in FIG. 2B relative to the depicted thickness of the substrate 204.

At the surface 104 of the optical disc 102, the substrate 204 is reflectively exposed at an outside diameter 210 and at an inside diameter 212 of the optical disc 102. That is, in one embodiment, the data surface 206 and the label surface 208 do not extend completely through or over the surface 104, and specifically do not extend through or over the outside diameter 210 nor through or over the inside diameter 212 of the optical disc 102. The inside diameter 212 surrounds the hole 202 of the optical disc 102. Whereas the optical disc 102 is depicted as having a single data surface, the data surface 206, and a single label surface, the label surface 208, in another embodiment of the invention there may be two data surfaces and/or two label surfaces, such that the optical disc 102 is double-sided. It is noted that whereas the substrate 204 may be designed to have the beam 108 pass therethrough, in one embodiment there is still sufficient reflection that occurs at the surface 104 where the substrate 204 is exposed.

Figure 3:
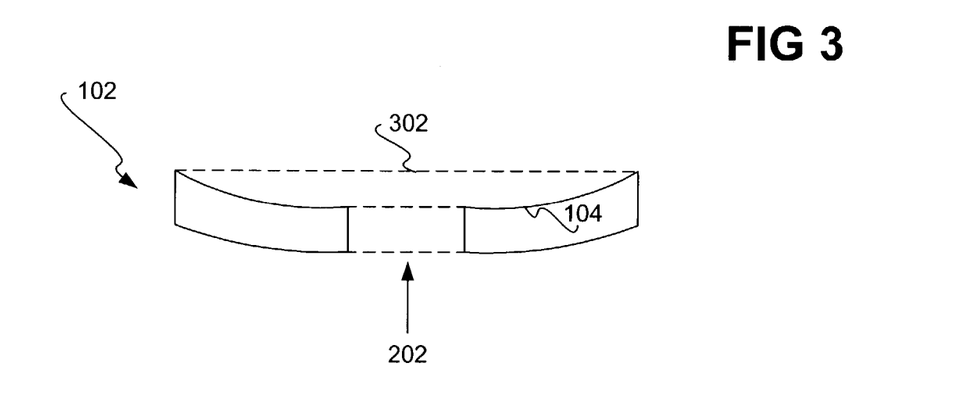
FIG. 3 is a diagram of a warped optical disc, in conjunction with which embodiments of the invention may be implemented.

Whereas the optical disc 102 is depicted in FIGS. 2A and 2B as being substantially flat, in many cases the optical disc 102 may in fact have a slight warp. FIG. 3 shows a cross-sectional side profile of the optical disc 102 according to an embodiment of the invention in which the disc 102 has a slight warp, which is exaggerated in FIG. 3 for illustrative clarity. The surface 104 of the optical disc 102 ideally should conform to the straight dotted line 302, but in actuality is warped as depicted in FIG. 3. Thus, the focus feedback mechanism 116 of FIG. 1 may be used in such instances where the surface 104 is sufficiently reflective to properly focus the optical beam 108 onto desired spots on the surface 104, such as the spot 112. However, as has been indicated, where the surface 104 is insufficiently reflective, the focus feedback mechanism 116 may not be able to properly focus the optical beam 108, which is disadvantageous where the optical disc 102 is warped, as in FIG. 3. The surface 104 may have other defects in addition to or other than the warp shown in FIG. 3 that also cause at least some spots on the surface 104 from conforming to the straight line 302.

Figure 4:
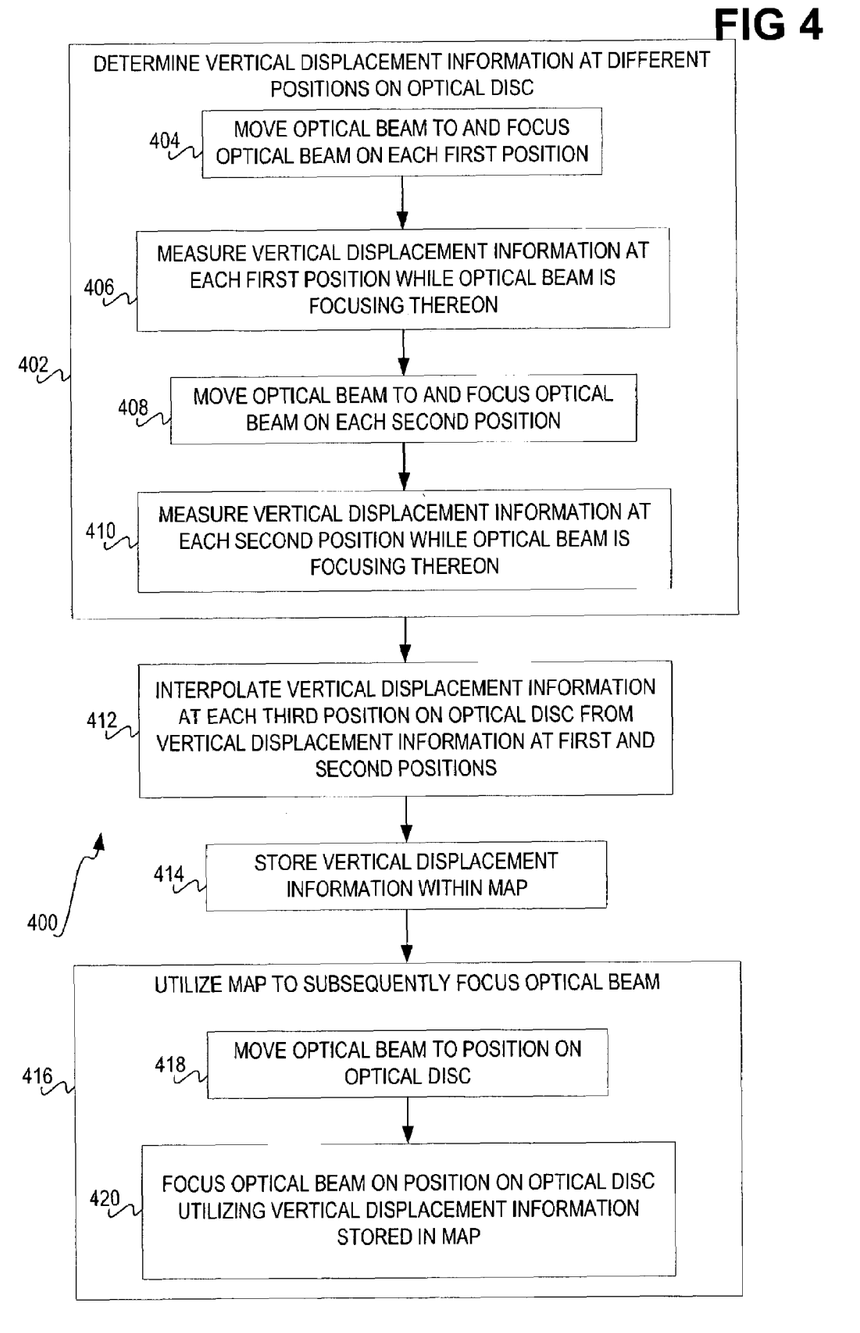
FIG. 4 is a flowchart of a method, according to an embodiment of the invention.

FIG. 4 shows a method 400 for focusing the optical beam 108 of FIG. 1 onto desired spots on the surface 104 of the optical disc 102, according to an embodiment of the invention. The method 400 provides for focusing of the optical beam 108 even where the surface 104 is insufficiently reflective to utilize the focus feedback mechanism 116 of FIG. 1, such as where the surface 104 is substantially covered by the label surface 208 of FIGS. 2A and 2B. The method 400 also provides for focusing of the optical beam 108 even where optical disc 102 is warped, as in FIG. 3, and/or has other surface defects. The method 400 may be implemented as computer-executable instructions, such as a computer program, stored on a computer-readable medium, like a volatile or non-volatile medium, an optical, semiconductor, and/or magnetic medium, and so on.

Vertical displacement information is first directly determined at different positions on the optical disc 102 where reflectivity is relatively high, such that the focus feedback mechanism 116 of FIG. 1 can be utilized (402). For instance, the positions may be those on the surface 104 where the substrate 204 of the optical disc 102 is reflectively exposed, as depicted in FIG. 2B. Vertical displacement information is generally defined as any type of information that indirectly or directly allows the optical beam 108 to be properly focused on the optical disc 102. For instance, the information may include the height of the optical disc 102 at each position, or the variation of the height of the optical disc 102 at each position from an ideal, straight position, such as the straight dotted line 302 of FIG. 3. The information may also include the drive current utilized to govern the position of the objective lens 110 of FIG. 1 to properly focus the optical beam 108 therethrough.

The vertical displacement information is directly determined for the positions in 402 in that the information is based on something that has been directly determined, detected, measured, and/or sensed for the positions. However, the information actually recorded as the vertical displacement information for a given of these positions may not be the information that is actually determined, detected, measured, and/or sensed, although the recorded vertical displacement information is in fact based on such actually determined, detected, measured, and/or sensed information. Furthermore, in one embodiment, the vertical displacement information is determined in the frequency domain. For instance, the information may include the summing of a static offset, one or more sine waves, and one or more cosine waves of a sensor signal, such as the signal measured by the focus feedback mechanism 116 of FIG. 1. Recording frequency-domain information may allow for less information to have to be determined and thus recorded.

In one embodiment, the determination of the vertical displacement information in 402 is accomplished by performing 404, 406, 408, and 410. First, the optical beam 108 is moved to and focused on each of a number of first positions on the optical disc 102 (404). These first positions may include all the positions on the inside diameter 212 of the optical disc 102, as depicted in FIGS. 2A and 2B. More generally, in one embodiment the first positions are contiguous, in that they occupy a contiguous region of the optical disc 102. While the beam 108 is focusing at each first position, the vertical displacement information for the position is measured, which is a direct determination of the information (406). For instance, the drive current needed to control the position of the objective lens 110 of FIG. 1 to properly focus the beam 108 at the position may be detected, sensed, measured, or otherwise determined. In one embodiment, the vertical displacement information at each position is sampled more than once, and is combined, such as by averaging.

Next, the optical beam 108 is moved to and focused on each of a number of second positions on the optical disc 102 (408). These second positions may include all the positions on the outside diameter 210 of the optical disc 102, as depicted in FIGS. 2A and 2B. More generally, in one embodiment the second positions are also contiguous, in that they occupy a contiguous region of the optical disc 102, but are non-contiguous with the first positions on which the optical beam 108 previously focused. That is, the contiguous region encompassing the second positions is non-contiguous with the contiguous region encompassing the first positions. While the beam is focusing at each second position, the vertical displacement information is again measured, which is a direct determination of the information (410), such as the drive current needed to position the objective lens 110 to properly focus the beam 108 at the position. In one embodiment, the vertical displacement information at each position is sampled more than once, and is combined, such as by averaging.

The vertical displacement information for each of a number of third positions on the optical disc 102 is then interpolated from the vertical displacement information that has been determined at the first and the second positions (412). The interpolation of this information is an indirect determination in that it is not based on anything that has been measured or otherwise directly determined for the third positions. The third positions on the optical disc 102 are preferably those at which the optical disc 102 has insufficiently high reflectivity to utilize the focus feedback mechanism 116 of FIG. 1. For instance, the third positions may include all those on the surface 208 of the optical disc 102, as depicted in FIGS. 2A and 2B.

The interpolation may be a linear or a non-linear interpolation. Where the interpolation is non-linear, it may be based on a warp model or another type of model that predicts the unknown vertical displacement information of the third positions from the known vertical displacement information of the first and the second positions. The vertical displacement information interpolated for at least the third positions is then stored within a vertical displacement information map (414). The vertical displacement information measured for the first and the second positions may also be stored within the map.

Furthermore, the surface 104 of the optical disc 102 may be insufficiently reflective in one embodiment because the optical beam 108 is designed to focus through the substrate 204, where the substrate 204 is transparent. Focusing is thus pre-corrected for the spherical aberration that the substrate 204 in such instance causes. Without the substrate 204 being transparent, however, focusing may not properly occur. That is, the focus feedback mechanism 116 of FIG. 1 may not be able to properly control the location and movement of the objective lens 110 because such focusing is pre-corrected for spherical aberration that results from focusing through the substrate 204. An embodiment of the invention thus can be utilized to focus the optical beam 108 through the objective lens 110, even when the surface 104 is sufficiently reflective.

Figure 5:
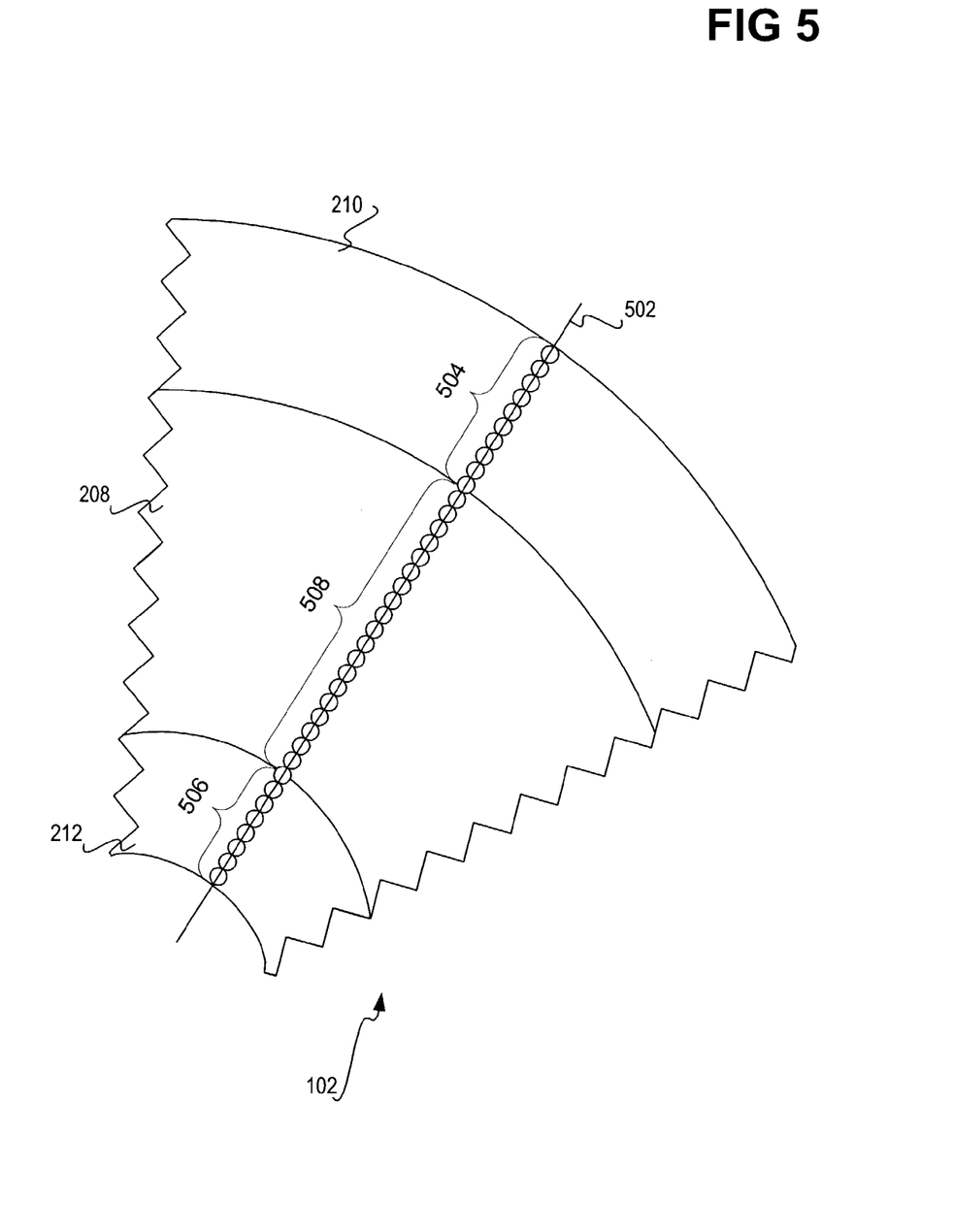
FIG. 5 is a diagram of an example performance of the interpolation that is performed as part of the method of FIG. 4, according to an embodiment of the invention.

FIG. 5 shows illustratively an example of the interpolation of the vertical displacement information that can be accomplished in 412 of the method 400 of FIG. 4, and that is stored in the map in 414 of the method 400, according to an embodiment of the invention. As can be appreciated by those of ordinary skill within the art, the interpolation accomplished in 412 may be performed in other ways besides that which is illustratively depicted in FIG. 5. A portion of the optical disc 102 is shown, having the label surface 208, the outside diameter 210, and the inside diameter 212. A referential radial line 502 extends from the center of the optical disc 102 to its outside edge.

First positions 506 within the inside diameter 212, second positions 504 within the outside diameter 210, and third positions within the label surface 208 are situated on the radial line 502. The vertical displacement information is directly determined for each of the first positions 506 in 406 of the method 400 of FIG. 4, as well as for each of the second positions 504 in 410 of the method 400. From such vertical displacement information, the vertical displacement information for each of the third positions 508 can then be indirectly determined by interpolation in 412 of the method 400. The information for the third positions 508, and optionally for the first positions 506 and the second positions 504, is then stored in the vertical displacement map in 414 of the method 400.

As has been noted, the vertical displacement information for the third positions on the non-reflective surface 208 can be interpolated from the known information for the first positions and the second positions on the inside and outside diameters 212 and 210 in other ways as well. For instance, in the example of FIG. 5, the vertical displacement information for a given of the third positions 508 on the radial line 502 is based on a linear interpolation of the known information of the first and the second positions 506 and 504 that are also on the radial line 502. However, in another embodiment, the vertical displacement information for a given of the third positions 508 may be interpolated based on the known information of other of the first and the second positions, besides those positions 506 and 504 that are also on the radial line 502. That is, whereas the interpolation example depicted in FIG. 5 is a one-dimensional along the radial line 502, the interpolation may also be two-dimensional, and so on.

Referring back to FIG. 4, in 416 the vertical displacement information map is utilized to subsequently focus the optical beam 108 (416). Where the map stores information regarding only the third positions on the insufficiently reflective portions of the surface 104, the map is used to focus the optical beam 108 on spots within such insufficiently reflective portions of the surface 104. Where the map stores information regarding the first and the second positions on the sufficiently reflective portions of the surface 104, the map can also be used to focus the optical beam 108 on spots within such sufficiently reflective portions on the surface 104, in lieu of employing the focus feedback mechanism 116 of FIG. 1. In general, for a given third position on the optical disc 102, the beam 108 is focused on the position by looking up the vertical displacement information for the position stored in the map, which is then utilized to focus the beam 108, without feedback, instead of using a feedback approach that relies on the position having sufficient reflectivity, as is the case when the focus feedback mechanism 116 is used.

More specifically, the vertical displacement information is utilized in 416 by performing 418 and 420. First, the optical beam is moved over a desired position on the optical disc 102 (418). Next, the optical beam is focused on the desired position by utilizing the vertical displacement information for the position stored in the map. For instance, where the vertical displacement information includes the appropriate value for the drive current for focusing the optical beam 108 of FIG. 1 through the objective lens 110 for the position, the value is looked up in the map, and the drive current is set to this value. That is, in such instance, the focus feedback mechanism 116 is not utilized to adjust the drive current to focus the optical beam 108 based on the optical beam 108' reflected back to the mechanism 116, such that focusing is accomplished without feedback. This is because the optical beam 108' is not likely to be of sufficiently high intensity to be properly sensed, since the third position on the optical disc 102 is likely to insufficiently reflect the beam 108 as the beam 108'.

Optical Discs

An embodiment of the invention has been described in the preceding section of the detailed description in which the vertical displacement information is directly determined for positions on the outside diameter 210 and the inside diameter 212 of the optical disc 102, as depicted in FIGS. 2A and 2B. In other embodiments of the invention, however, the vertical displacement information is directly determined for different positions on the optical disc 102, such that the vertical displacement information for other positions can then be interpolated therefrom, and thus indirectly determined.

For instance, the positions on the outside diameter 210 are at a fixed distance away from the center of the optical disc 102 in FIGS. 2A and 2B, and can be considered fixed-radius positions on the optical disc 102. The same is true for the positions on the inside diameter 212. However, positions on the optical disc 102 at other fixed-radii positions may also be utilized, and not just the positions on the inside diameter 212 and/or on the outside diameter 210. There may also be more than two non-contiguous regions of positions that are used to directly determine vertical displacement information in 404 of the method 400 of FIG. 4.

Figure 6A:
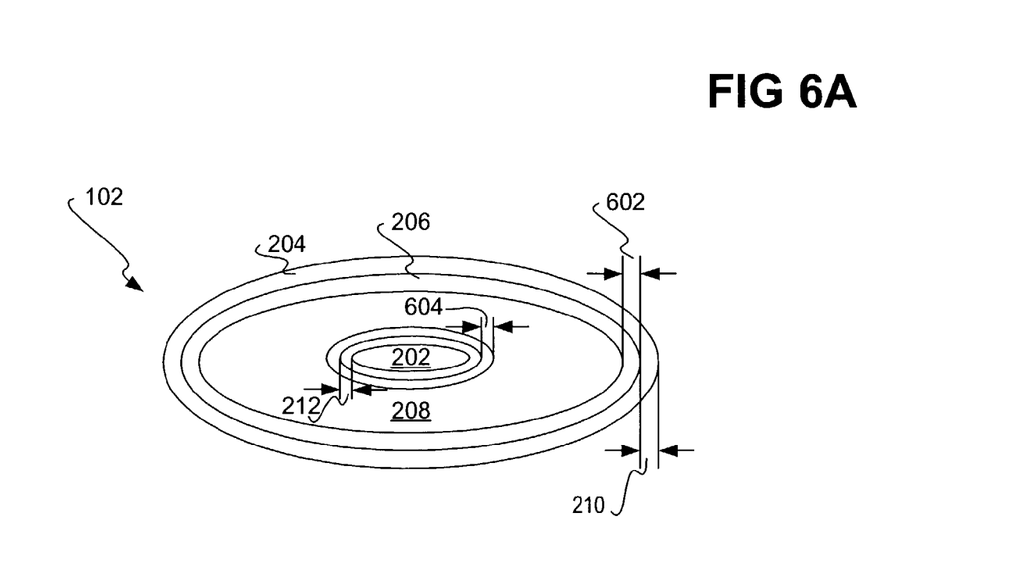
FIGS. 6A and 6B are a perspective-view diagram and a cross-sectional side-profile diagram, respectively, of an optical disc, according to a particular embodiment of the invention.
Figure 6B:
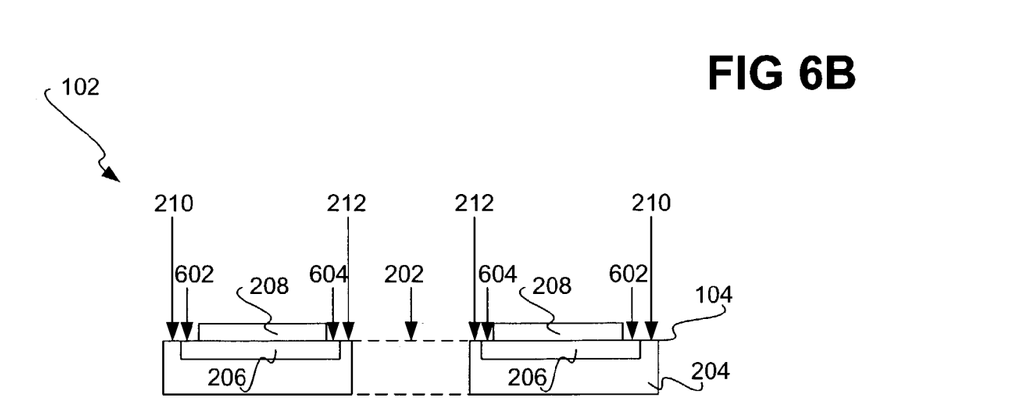

Furthermore, FIGS. 6A and 6B show a perspective view and a cross-sectional side profile, respectively, of the optical disc 102, according to a different embodiment of the invention. In contradistinction to the optical disc 102 of the embodiment of FIGS. 2A and 2B, the optical disc 102 of the embodiment of FIGS. 6A and 6B does not have the label surface 208 extending completely over the data surface 206. That is, the label surface 208, or region, is smaller in area than the data surface 206, or region. Thus, when the optical beam 108 of FIG. 1 is incident to the surface 104 of the optical disc 102, the backside of the data surface 206 is partially reflectively exposed, specifically at an outer diameter 602 and at an inner diameter 604.

Therefore, when directly determining the vertical displacement information in 402 of the method 400 of FIG. 4, such information can be determined off the positions within the diameters 602 and 604, instead of off the positions within the diameters 210 and 212. Such vertical displacement information is obtained by reflecting the optical beam 108 off the sufficiently reflective backside surface of the data surface 206. The inner diameter 604 and the outer diameter 602 are further non-contiguous to one another, and may also be more generally considered as inside-diameter and outside-diameter circular regions, respectively, at different radii from the center of the optical disc 102. Other numbered components of the optical disc 102 as shown in FIGS. 6A and 6B are at least substantially descriptively identical to their previously provided descriptions, which are not repeated to avoid descriptive duplication.

Figure 7A:
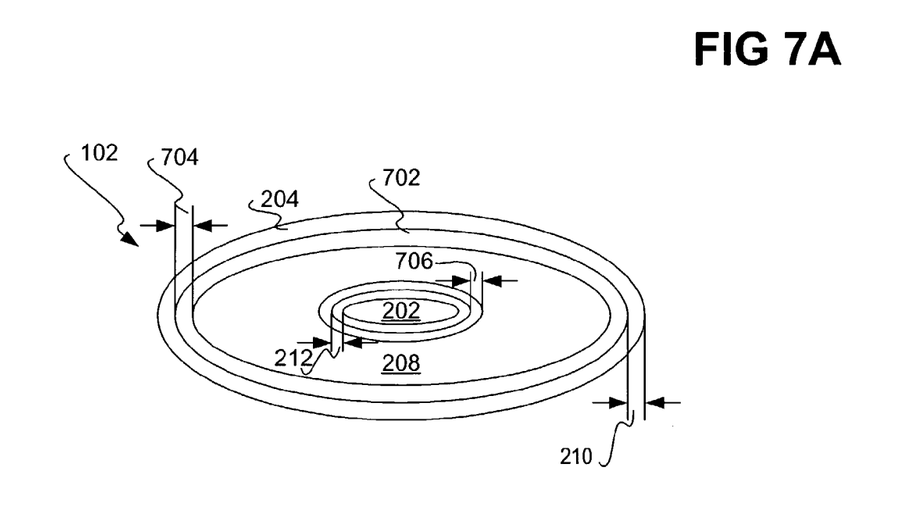
FIGS. 7A and &B are a perspective-view diagram and a cross-sectional side-profile diagram, respectively, of an optical disc, according to another particular embodiment of the invention.
Figure 7B:
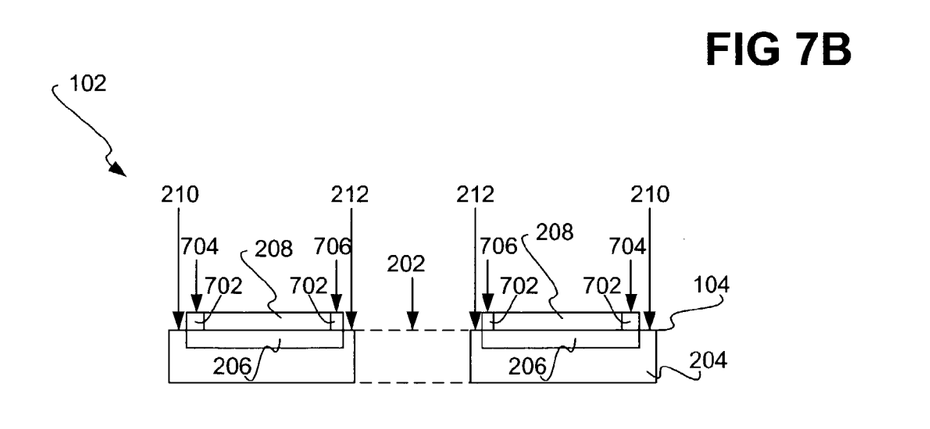

FIGS. 7A and 7B show a perspective view and a cross-sectional side profile, respectively, of the optical disc 102, according to another embodiment of the invention. The optical disc 102 of the embodiment of FIGS. 7A and 7B includes a sufficiently reflective surface 702 situated alongside the insufficiently reflective label surface 208, specifically at an outer diameter 704 and at an inner diameter 706. Therefore, when directly determining the vertical displacement information in 402 of the method 400 of FIG. 4, such information can be determined off the positions within the diameters 704 and 706, instead of off the positions within the diameters 210 and 212. The information is obtained by reflecting the optical beam 108 of FIG. 1 off the reflective surface 702, which may be a metallic or another type of reflective surface.

The outer diameter 704 and the inner diameter 706 are more generally specialized optical disc vertical displacement information regions of the optical disc 102 that are reflectively exposed when the optical beam 108 is incident to the surface 104 of the disc 102. Such specialized regions may be located at places on the disc 102 other than the outer diameter 704 and/or the inner diameter 706. As before, the regions are non-contiguous to one another. The outer and the inner diameters 704 and 706 can also be considered more generally as outside-diameter and inside-diameter circular regions, respectively, at different radii from the center of the optical disc 102. As depicted in FIGS. 7A and 7B, the label surface 208 and the specialized surface 702 substantially entirely occupy the surface 104 of the optical disc 102, although this does not necessarily have to be the case. As before, other numbered components of the optical disc 102 as shown in FIGS. 7A and 7B are at least substantially descriptively identical to their previously provided descriptions, which are not repeated to avoid descriptive duplication.

Mass Storage Device

Figure 8:
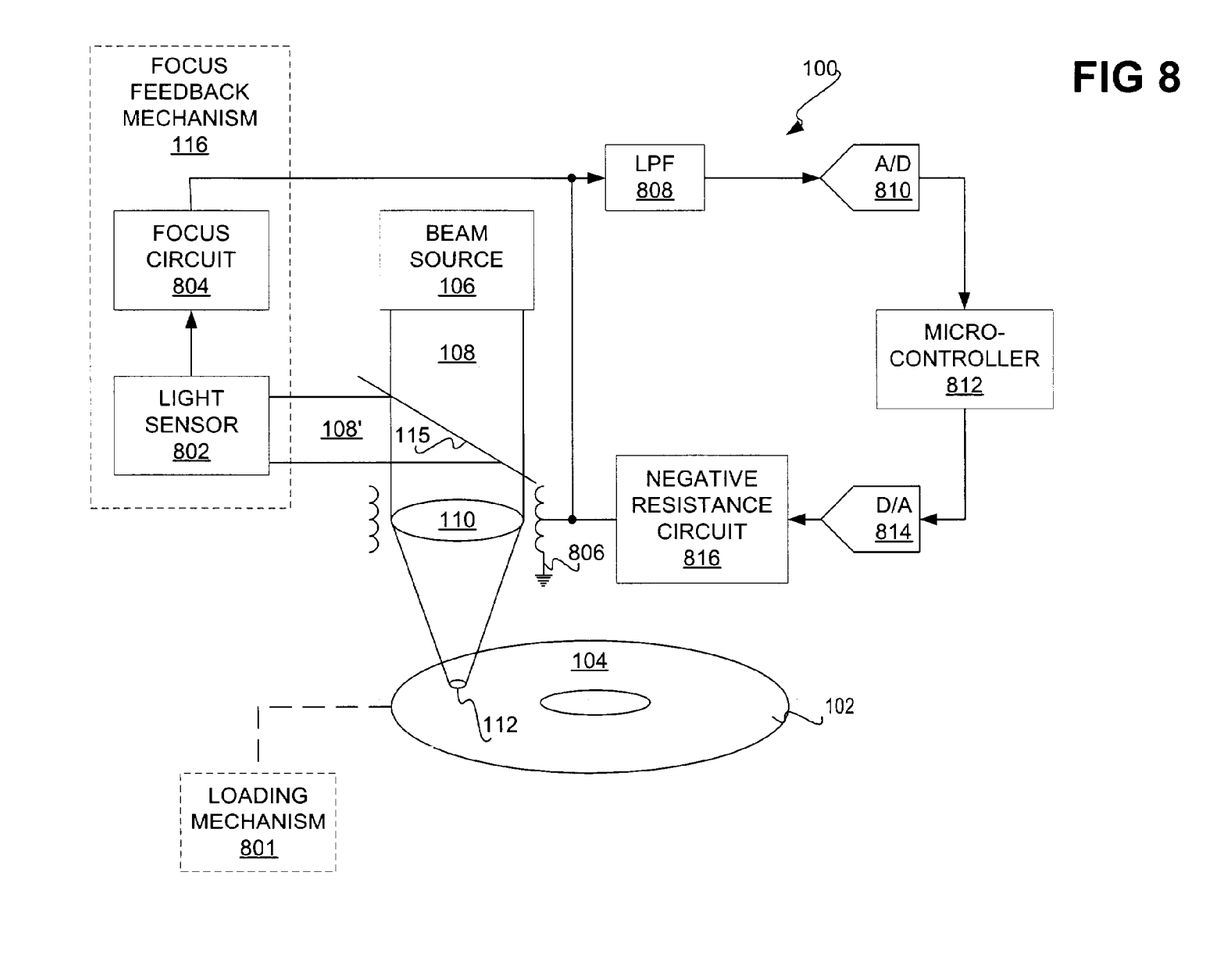
FIG. 8 is a diagram of a mass storage device, according to an embodiment of the invention.

FIG. 8 illustratively shows the mass storage device 100, according to an embodiment of the invention, which is more detailed than but consistent with the device 100 of the embodiment of FIG. 1. Like-numbered components between the embodiments of FIGS. 8 and 1 operate at least substantially identically, and therefore description thereof in the context of FIG. 8 is not made to the same degree as has already been done in the context of FIG. 1, to avoid descriptive duplication. Furthermore, as can be appreciated by those of ordinary skill within the art, other mass storage device components in addition to and/or in lieu of those depicted in FIG. 8 may normally be present, but are omitted only for sake of illustrative and descriptive clarity.

The optical disc 102 is loaded into the mass storage device 100 via a loading mechanism 801, which can be a tray mechanism, a feed-and-eject mechanism, or another type of loading mechanism. The beam source 106 focuses the optical beam 108 through the objective lens 110 onto the spot 112 on the surface 104 of the optical disc 102. Where the surface 104 at the spot 112 is sufficiently reflective, the optical beam 108 reflects back to the optical mechanism 115, which diverts the optical beam 108 as the reflected optical beam 108' to the focus feedback mechanism 116. Thus, the focus feedback mechanism 116 is utilized in 402 of the method 400 of FIG. 4 to assist in determining the vertical displacement information at different sufficiently reflective positions on the optical disc 102, as has been described.

The focus feedback mechanism 116 specifically includes a light sensor 802 and a focus circuit 804. The light sensor 802 detects the reflected optical beam 108', and is communicatively coupled to the focus circuit 804. Based on the reflected beam 108' as detected by the light sensor 802, the focus circuit 804 determines whether the beam 108 has properly focused on the spot 112, such as by comparing the signal output by the light sensor 802 with a reference in-focus signal. If the beam 108 is not sufficiently focused on the spot 112, the focus circuit 804 varies the drive current through the focus coil 806 that controls movement of the objective lens 110, and thus the focusing of the beam 108 onto the spot 112 as well. This feedback process continues until the beam 108 is sufficiently focused on the spot 112.

Once the drive current through the focus coil 806 has stabilized, such that the optical beam 108 is sufficiently focused on the spot 112, the drive current that is passed through an optional low-pass filter (LPF) 808, and through the analog-to-digital (A/D) converter 810 to the micro-controller 812, represents the vertical displacement value for the position on the surface 104 corresponding to the spot 112. The optional LPF 808 removes high-frequency components of the current that may result from incidental jarring of the mass storage device 100, whereas the A/D converter 810 converts the current from an analog value to a digital value. The micro-controller 812, which is more generally a controller including hardware and/or software components, records the drive current value for the sufficiently reflective position on the surface 104 that corresponds to the spot 112.

This process is repeated for a number of sufficiently reflective positions on the surface 104 of the optical disc 102, with the micro-controller 812 recording the drive current, which is one type of vertical displacement information, for each position. From this information, the micro-controller 812 interpolates the drive current needed to focus the optical beam 108 at preferably every insufficiently reflective position on the surface 104 of the disc 102. The interpolated vertical displacement information for the insufficiently reflective positions, as well as optionally the vertical displacement information for the sufficiently reflective positions, is recorded by the micro-controller 812 within a vertical displacement information map.

When the optical beam 108 is subsequently needed to be focused at a position on the surface 104 of the optical disc 102 that is insufficiently reflective, such that the focus feedback mechanism 116 cannot be utilized to focus the beam 108, the micro-controller 812 reads the interpolated drive current value for the position in the map. The micro-controller 812 passes the information through a digital-to-analog (D/A) converter 814, and optionally through a negative resistance circuit 816, so that the focus coil 806 is driven by the appropriate drive current to position, or move, the objective lens 110 so that the optical beam 108 is properly focused at the desired position. The D/A converter 814 converts the looked-up drive current value from a digital value to an analog value, whereas the optional negative resistance circuit 816 stabilizes the drive current. The micro-controller 812 thus utilizes an open-loop, or feed-forward, approach, without feedback, to focus the optical beam 108 at the desired position. That is, the micro-controller 812 does not utilize a closed-loop, or feedback, approach to focus the optical beam 108 at the desired position.

The focus coil 806, the micro-controller 812, the D/A converter 814, and/or the optional negative resistance circuit 816 may be considered the mechanism utilized to focus the optical beam 108 at a position on the optical disc 102 without focus-sensing feedback, by utilizing the previously interpolated optical disc vertical displacement information map. Similarly, the focus coil 806, the focus feedback mechanism 116, the LPF 808, the A/D converter 810, and the micro-controller 812 may be considered the mechanism utilized to generate the optical disc vertical displacement information map upon the loading of the optical disc 102 via the loading mechanism 801. Thus, these two mechanisms effectively share some mass storage device components, namely the focus coil 806 and the micro-controller 812.

Figure 9:
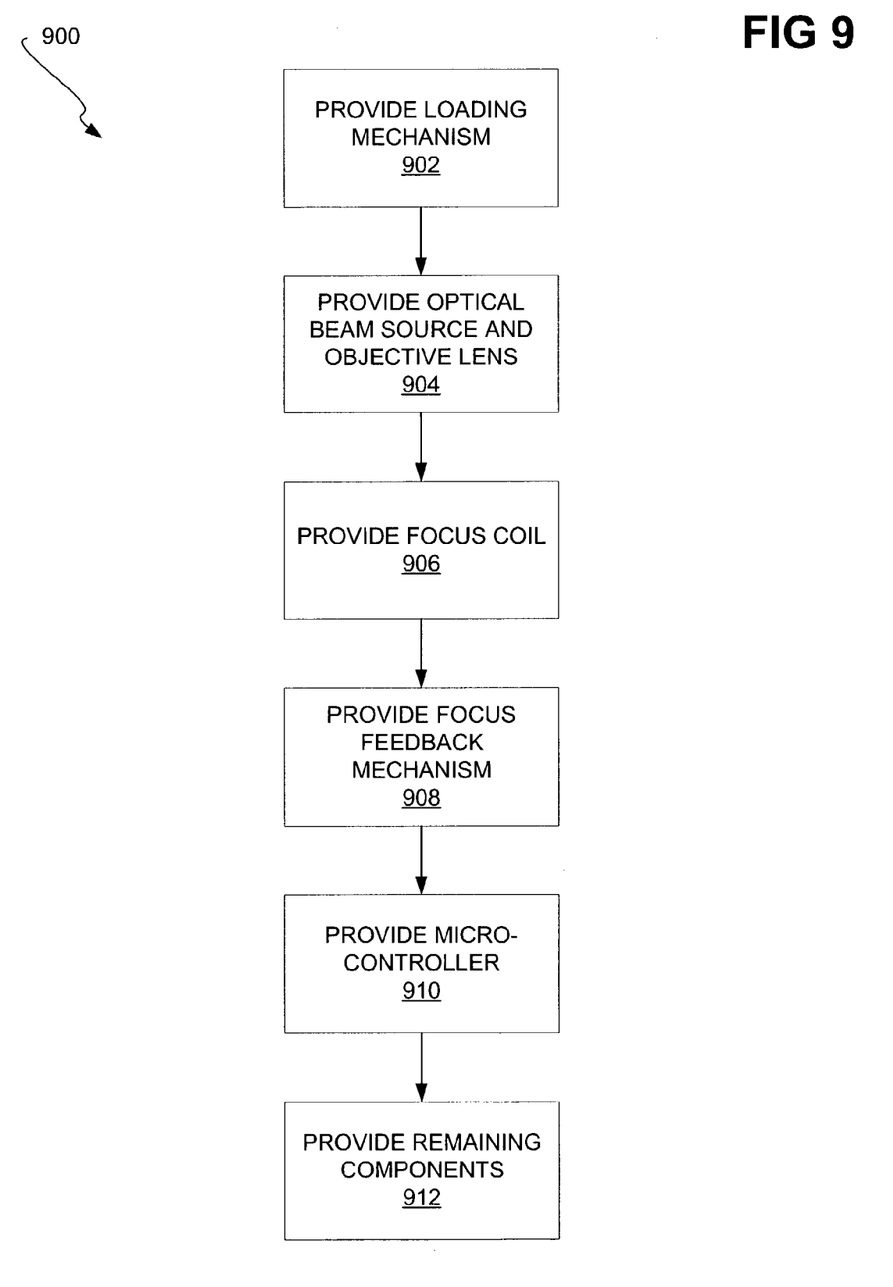
FIG. 9 is a method of manufacture, according to an embodiment of the invention.

FIG. 9 shows a method 900, according to an embodiment of the invention, for manufacturing the mass storage device 100 of FIG. 8 that has been described. The loading mechanism 801 that is receptive to the optical disc 102 is provided (902), as well as the optical beam source 106 to generate the optical beam 108 and the objective lens 110 through which the optical beam 108 is focused onto the optical disc 102 (904). The focus coil 806 is provided that moves, or positions, the objective lens 110 based on a drive current therethrough to focus the optical beam 108 onto the optical disc 102 (906). The focus feedback mechanism 116, including the light sensor 802 and the focus circuit 804, is provided to determine the drive current for the focus coil 806 that enables the optical beam 108 to be focused on sufficiently reflective positions of the surface 104 of the optical disc 102 (908).

The micro-controller 812 is also provided (910). As has been described, the micro-controller 812 generates the vertical displacement information map, and provides the drive current through the focus coil 806 that enables the optical beam 108 to focus on insufficiently reflective positions of the surface 104 of the disc 102, based on drive current values read for the positions from the map. Finally, remaining components of the mass storage device 100 of FIG. 8 are provided (912). Such components can include the LPF 808, the A/D converter 810, the D/A converter 814, and the negative resistance circuit 816, as well as any other mass storage device components not depicted in FIG. 8.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

For example, embodiments of the invention have been substantially described in relation to a mass-storage device that utilizes computer-readable media that are optical discs. In such embodiments, a read/write mechanism that is variably positioned over an optical disc includes an optical beam source that generates an optical beam, and an objective lens that is variably positioned over the optical disc and through which the optical beam is focused onto the optical disc. Furthermore, in such embodiments a sensing and adjustment mechanism includes a focus feedback mechanism to sense positioning of the objective lens over the optical disc, and a controller to adjust the positioning of the objective lens over the optical disc.

However, other embodiments of the invention may utilize computer-readable media other than optical discs, such as magnetic media, solid-state media, and/or other types of optical media. For instance, in one such embodiment, a hard disk drive-type mass storage device includes a hard disk, which is a magnetic computer-readable medium that is fixedly loaded into the mass storage device. The read/write mechanism in such instance may be a read/write head that is able to read data from and write data to the hard disk. The sensing and adjustment mechanism may be a capacitive proximity detector that detects the distance of the read/write head over the hard disk, and a piezo air-bearing adjustment to adjust this distance.

We claim:

1. A method comprising:
   determining optical disc vertical displacement information at each of a plurality of positions on a label surface of an optical disc, the plurality of positions having sufficiently high reflectivity such that optical disc vertical displacement information is directly determinable utilizing a focus feedback mechanism; and
   interpolating optical disc vertical displacement information at a plurality of other positions on the label surface of the optical disc from the optical disc vertical displacement information directly determined at the plurality of positions on the label surface of the optical disc, the plurality of other positions on the label surface of the optical disc having insufficiently high reflectivity such that optical disc vertical displacement information at the plurality of other positions is not directly determinable utilizing the focus feedback mechanism.

2. The method of claim 1, wherein determining the optical disc vertical displacement information at the plurality of positions on the optical disc comprises directly determining the optical disc vertical displacement information at a plurality of positions on an inside diameter of the optical disc.

3. The method of claim 2, wherein determining the optical disc vertical displacement information at the plurality of positions on the optical disc farther comprises directly determining the optical disc vertical displacement information at a plurality of positions on an outside diameter of the optical disc.

4. The method of claim 1, wherein determining the optical disc vertical displacement information at the plurality of positions on the optical disc comprises directly determining the optical disc vertical displacement information at a plurality of first fixed-radius positions on the optical disc.

5. The method of claim 4, wherein determining the optical disc vertical displacement information at the plurality of positions on the optical disc further comprises directly determining the optical disc vertical displacement information at a plurality of second fixed-radius positions on the optical disc.

6. The method of claim 1, wherein determining the optical disc vertical displacement information at the plurality of positions on the optical disc comprises directly determining the optical disc vertical displacement information at a plurality of positions of the optical disc at which a substrate material of the optical disc is reflectively exposed.

7. The method of claim 1, wherein determining the optical disc vertical displacement information at the plurality of positions on the optical disc comprises directly determining the optical disc vertical displacement information at a plurality of positions at which a backside of a data surface of the optical disc is reflectively exposed.

8. The method of claim 1, wherein determining the optical disc vertical displacement information at the plurality of positions on the optical disc comprises directly determining the optical disc vertical displacement information at a plurality of positions at which one or more specialized optical disc vertical displacement information regions of the optical disc are reflectively exposed.

9. The method of claim 1, wherein determining the optical disc vertical displacement information at the plurality of positions on the optical disc comprises sensing a reflectivity of the optical disc at each of the plurality of positions.

10. The method of claim 1, wherein determining the optical disc vertical displacement information at the plurality of positions on the optical disc comprises measuring a driving current as an optical beam focuses at each of the plurality of positions.

11. The method of claim 1, wherein determining the optical disc vertical displacement information at the plurality of positions on the optical disc comprises determining the optical disc vertical displacement information at the plurality of positions in a frequency domain.

12. The method of claim 11, wherein determining the optical disc vertical displacement information at the plurality of positions in the frequency domain comprises summing a static offset, one or more sine waves, and one or more cosine waves of a sensor signal in the frequency domain at the plurality of positions.

13. The method of claim 1, wherein determining the optical disc vertical displacement information at the plurality of positions on the optical disc comprises determining the optical disc vertical displacement information more than one time at each of the plurality of positions and combining the optical disc vertical displacement information determined at each of the plurality of positions.

14. The method of claim 1, wherein interpolating the optical disc vertical displacement information at the plurality of other positions on the optical disc comprises linearly interpolating the optical disc vertical displacement information at the plurality of other positions on the optical disc.

15. The method of claim 1, further comprising storing the optical disc vertical displacement information at the plurality of positions and at the plurality of other positions on the optical disc within an optical disc vertical displacement information map.

16. The method of claim 1, further comprising utilizing the optical disc vertical displacement information at the plurality of other positions on the optical disc to focus an optical beam on the plurality of other positions on the optical disc.

17. The method of claim 1, wherein the optical disc is one of a compact disc (CD)-type and a digital versatile disc (DVD)-type optical disc.

18. The method of claim 1, wherein markings can be optically written on the label surface of the optical disc.

19. The method of claim 18, wherein the optical disc has a data surface opposite the label surface on which data can be optically written.

20. A computer-readable medium having computer-executable instructions stored thereon to perform a method, the method comprising:
    measuring optical disc vertical displacement information at a plurality of first contiguous positions on a label surface of an optical disc while an optical beam is focusing thereon, each of the plurality of first contiguous positions having sufficiently high reflectivity such that the optical disc vertical displacement information at the plurality of first contiguous positions is directly determinable using a focus feedback mechanism;
    measuring optical disc vertical displacement information at a plurality of second contiguous positions on the label surface of the optical disc while the optical beam is focusing thereon, each of the plurality of second contiguous positions having sufficiently high reflectivity such that the optical disc vertical displacement information at the plurality of second contiguous positions is directly determinable using the focus feedback mechanism;
    interpolating optical disc vertical displacement information at a plurality of other positions on the label surface of the optical disc from the optical disc vertical displacement information measured at each of the plurality of first contiguous positions and the plurality of second contiguous positions, each of a the plurality of other positions on the label surface of the optical disc having insufficiently high reflectivity such that the optical disc vertical displacement information at the plurality of other positions is not directly determinable utilizing the focus feedback mechanism; and
    focusing the optical beam on at least one position of the plurality of other positions on the label surface of the optical disc by utilizing the interpolated optical disc vertical displacement information at the plurality of other positions.

21. The medium of claim 20, wherein measuring the optical disc vertical displacement information at each position of the plurality of first positions and at each of the plurality of second positions comprises measuring a driving current as the optical beam focuses at the position.

22. The medium of claim 20, wherein measuring the optical disc vertical displacement information at each position of the plurality of first positions and at each of the plurality of second positions comprises measuring the optical disc vertical displacement information at the position in a frequency domain.

23. The medium of claim 20, wherein markings can be optically written on the label surface of the optical disc, and wherein the optical disc has a data surface opposite the label surface on which data can be optically written.

24. A method comprising:
    providing a loading mechanism receptive to an optical disc having a label surface and a data surface opposite the label surface;
    providing an optical beam source to generate an optical beam and an objective lens through which the optical beam is focused onto the optical disc;
    providing a focus coil to move the objective lens based on a drive current therethrough to focus the optical beam onto the optical disc;
    providing a focus feedback mechanism to determine the drive current for the focus coil that enables the optical beam to be focused; and,
    providing a controller to generate a vertical displacement information map for a plurality of first positions on the label surface of the optical disc by recording the drive current for focusing the beam at each of a plurality of second positions on the label surface of the optical disc and interpolating the vertical displacement information map therefrom, and to focus the beam at one of the plurality of first positions by providing the coil with the drive current based on a current value read from the vertical displacement information map corresponding thereto,
    wherein each of the plurality of second positions has sufficiently high reflectivity so that optical disc vertical displacement information at each of the plurality of second positions is directly determinable by utilizing the focus feedback mechanism, and
    wherein each of the plurality of first positions has insufficiently high reflectivity to preclude directly determining optical disc vertical displacement information at each of the plurality of first positions by utilizing the focus feedback mechanism.

25. The method of claim 24, wherein the optical disc is one of a compact disc (CD)-type and a digital versatile disc (DVD)-type optical disc.

26. The method of claim 24, wherein markings can be optically written on the label surface of the optical disc, and wherein the optical disc has a data surface opposite the label surface on which data can be optically written.

* * * * *

UNITED STATES PATENT AND TRADEMARK OFFICE
CERTIFICATE OF CORRECTION

PATENT NO. : 7,239,582 B2  Page 1 of 1
APPLICATION NO. : 10/342017
DATED : July 3, 2007
INVENTOR(S) : Andrew Koll et al.

It is certified that error appears in the above-identified patent and that said Letters Patent is hereby corrected as shown below:

In column 11, line 59, in Claim 3, delete "farther" and insert -- further --, therefor.

In column 13, line 34, in Claim 20, after "each of" delete "a".

Signed and Sealed this

Twenty-second Day of September, 2009

David J. Kappos
*Director of the United States Patent and Trademark Office*